United States Patent [19]
Fraisse et al.

[11] Patent Number: 5,208,720
[45] Date of Patent: May 4, 1993

[54] ELECTRONIC TRIP DEVICE WITH SHORT DELAY FUNCTION

[75] Inventors: Didier Fraisse, St. Martin D'Heres; Marc Levain, Grenoble, both of France

[73] Assignee: Merlin Gerin, Meylan, France

[21] Appl. No.: 734,683

[22] Filed: Jul. 23, 1991

[30] Foreign Application Priority Data

Aug. 1, 1990 [FR] France ............................ 9009939

[51] Int. Cl.⁵ ............................................. H02H 7/00
[52] U.S. Cl. ........................................ 367/94; 361/96; 361/97
[58] Field of Search ................. 361/94, 96, 95, 97, 361/31, 50, 45

[56] References Cited

U.S. PATENT DOCUMENTS

| | | | |
|---|---|---|---|
| 3,792,313 | 2/1974 | Conrad | 361/94 |
| 4,589,052 | 5/1986 | Dougherty | 361/94 |
| 4,782,422 | 2/1988 | Jones et al. | 361/87 |

*Primary Examiner*—A. D. Pellinen
*Assistant Examiner*—Stephen W. Jackson
*Attorney, Agent, or Firm*—Parkhurst, Wendel & Rossi

[57] ABSTRACT

The short time delay circuit comprises a counter which is zero reset when the signal representative of the current is greater than or equal to a threshold, and controls count-down of an up-down counter, when the content of the counter reaches a preset value. A clock circuit controls the count-up and count-down frequency of the counter and up-down counter.

8 Claims, 4 Drawing Sheets

ELECTRONIC TRIP DEVICE WITH SHORT DELAY FUNCTION

BACKGROUND OF THE INVENTION

The invention relates to an electronic trip device comprising means for performing a short delay function, designed to produce a tripping signal when an input signal, representative of the current flowing in at least one conductor to be protected, is greater than a preset threshold value over a preset time delay period, said means comprising means for comparing the input signal and the threshold value producing a signal on output when the input signal is greater than the threshold value, and time delay means connected to the output of the comparison means.

In state-of-the-art electronic trip devices, the time delays of the long and short time delay functions are achieved by means of an RC circuit. A voltage representative of the current flowing in the conductor to be protected is applied to the time delay circuit, when the current amplitude exceeds a preset short or long time delay threshold. The time delay circuit supplies a tripping signal when its output signal reaches a preset value.

U.S. Pat. No. 3,792,313 describes a circuit of this kind wherein zero resetting of the time delay circuit is delayed when the current amplitude drops back below said preset threshold. Such a time lag may be about 20 ms when the frequency of the measured current is 60 Hz, thus making the form of the current signal between two peak values irrelevant, and in particular enabling a non-filtered rectified current signal to be used.

In this type of circuit, the uncertainty as to the value of the time delay is typically about 20% to 30%, and the reliability of the circuit can be reduced by the use of high capacity time delay capacitors.

SUMMARY OF THE INVENTION

The object of the invention is to achieve a solid-state trip device wherein the short delay function is achieved with a much more accurate time delay, while increasing the reliability of the circuit.

This object is achieved by the fact that the time delay means comprise a counter and an up-down counter each comprising a clock input receiving clock signals of preset frequencies from a clock circuit, a zero reset input of the counter being connected to the output of the comparison means, the output of the counter being connected to an up-down counting input of the up-down counter in such a way as to trigger its count-down when the content of the counter reaches a first preset value, the up-down counter supplying a tripping signal when its content reaches a second preset value.

The use of counters actuated at fixed preset frequencies enables the accuracy of the time delay, which can then be about 5%, to be very greatly increased. Eliminating the time delay capacitors greatly increases the reliability of the circuit. A circuit of this kind can be integrated more easily, notably in an ASIC, which also enables its cost and volume to be reduced. The use of an up-down counter enables a thermal memory to be connected to the short delay circuit.

According to a development of the invention, the time lag, necessary for the content of the counter to reach the first preset value in the absence of zero resetting of the counter, is greater than or equal to a quarter-period of the current, for example greater than or equal to 5 ms for a 50 Hz current.

When said time lag is greater than or equal to a half-period of the current, for example greater than or equal to 10 ms for a 50 Hz current, the time delay is insensitive to the form of the signal, notably when the trip device is associated with a single-phase circuit breaker.

According to a development of the invention, said time lag is smaller than the difference between the preset time delay and a preset non-tripping time.

It is moreover very easy to modify the time delay accurately by simply modifying the frequency of the clock signals.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
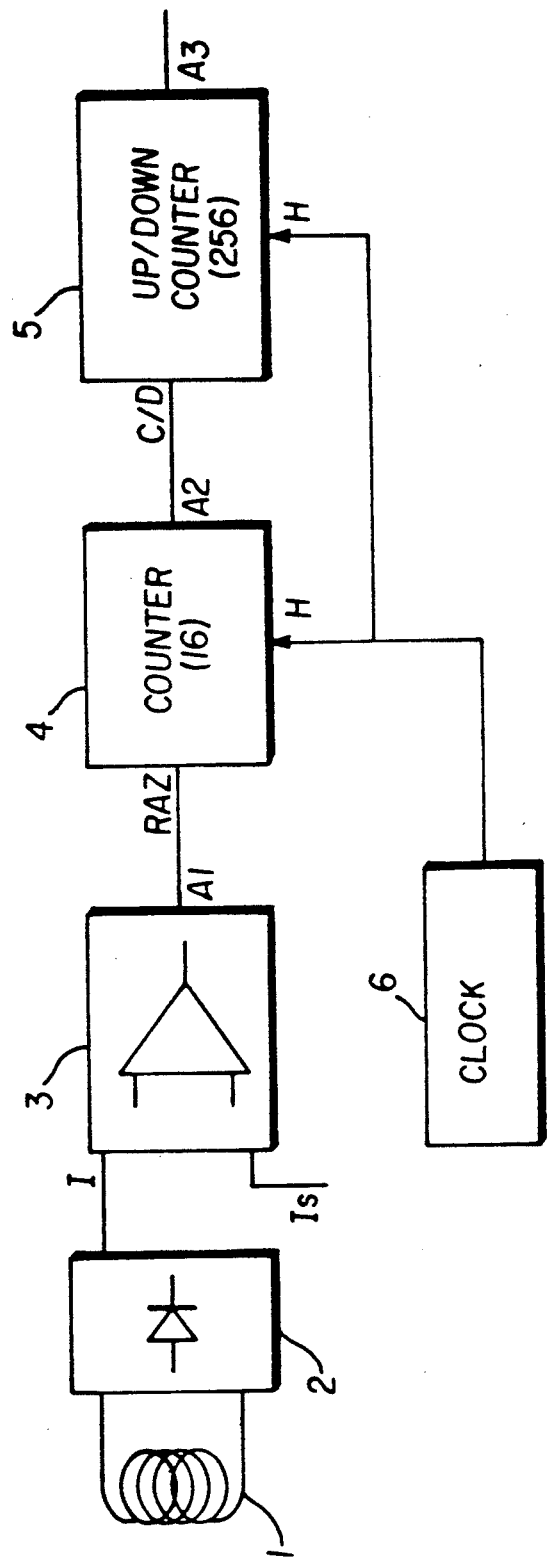
FIG. 1 represents a particular embodiment of a trip device according to the invention.

The trip device according to FIG. 1 comprises a current sensor 1 connected to a rectifier circuit 2, preferably formed by a full-wave rectifier. The output signal I from the rectifier circuit 2 is representative of the current flowing in the conductor to be protected.

Figure 2:
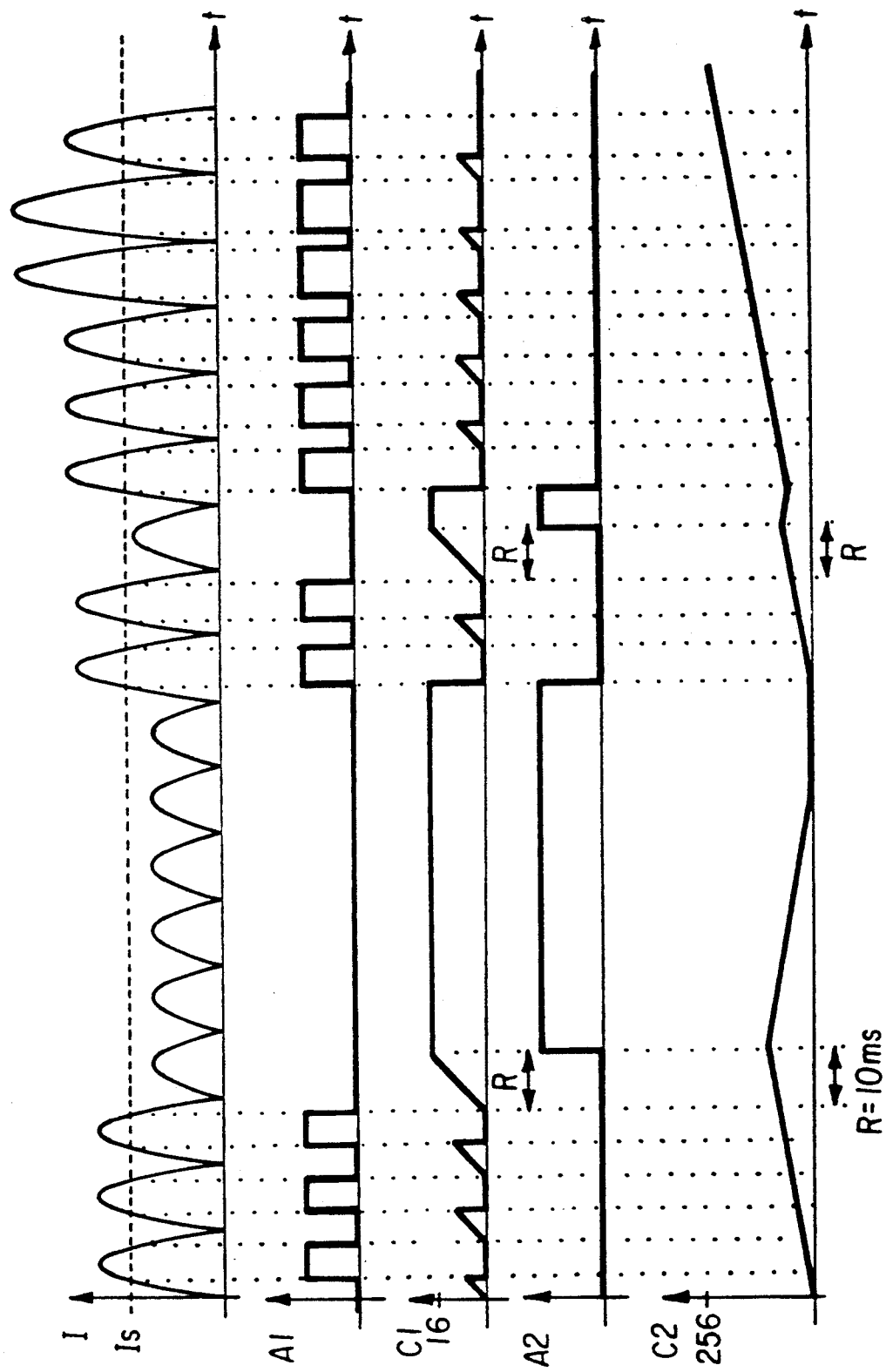
FIGS. 2 and 3 illustrate the wave forms of the signals at various points of the trip device according to FIG. 1, respectively for time lags R of 10 and 5 ms.

The signal I representative of the current is applied to an input of a comparator 3 where it is compared with a preset short delay threshold Is, applied to a second input of the comparator. The output signal A1 from the comparator 3 is at logic level 1 when the signal I is greater than the threshold Is (FIG. 2). The output from the comparator 3 is connected to the input of a time delay circuit whose output supplies a tripping signal (A3) when the signal I representative of the current exceeds the short delay threshold Is for a preset time.

The time delay circuit is formed by a counter 4, an up-down counter 5 and a clock circuit 6. The clock circuit 6 supplies clock signals of predetermined frequency to the clock inputs of the counter 4 and up-down counter 5. In the embodiment represented, the same clock signal H is applied to both the clock inputs.

Figure 3:
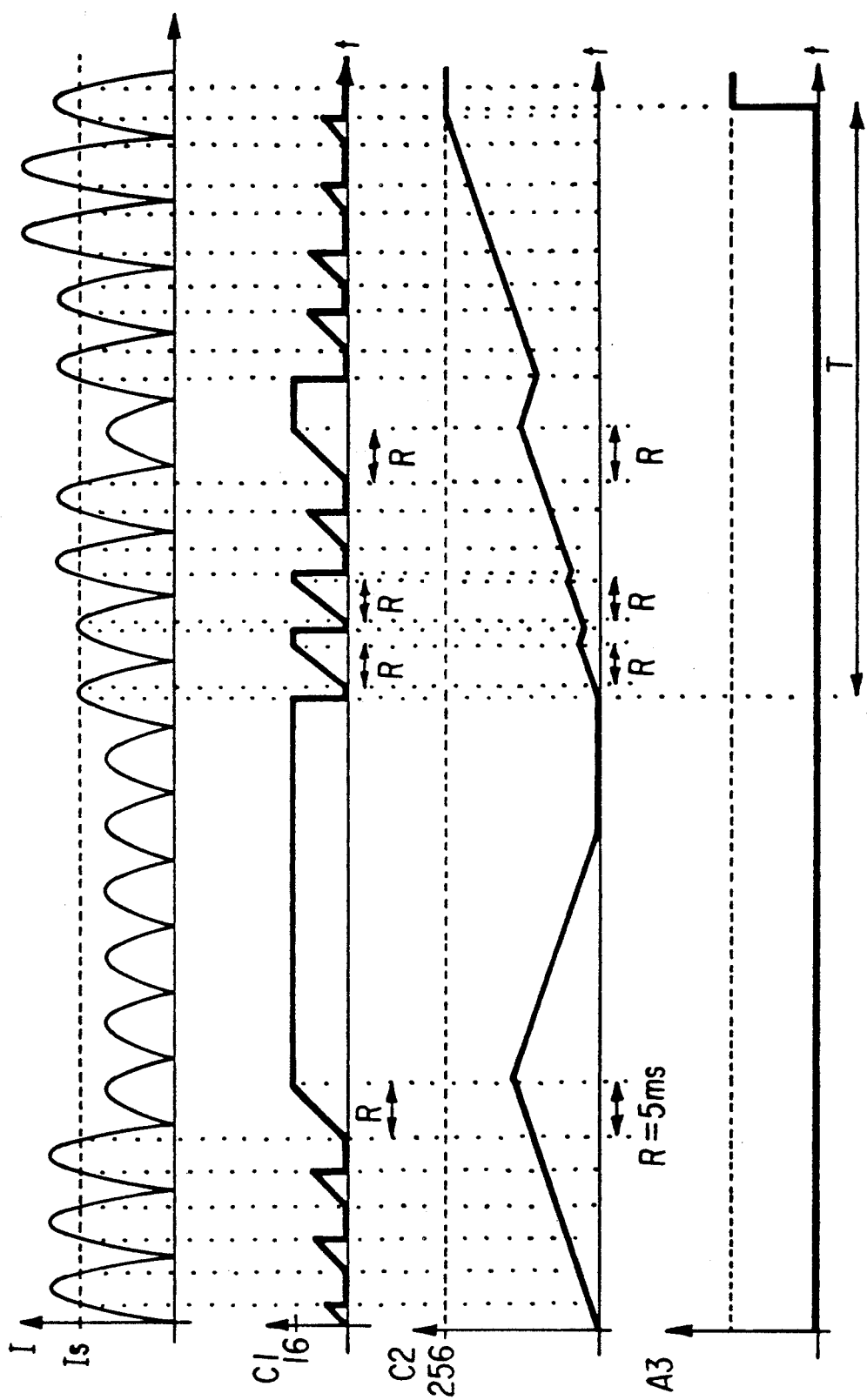

The output of the comparator 3 is connected to the zero reset input (RAZ) of the counter 4. The latter supplies on output a signal A2 at logic state 1 when its content C1 reaches a first preset value, for example 16 in the embodiment represented. The content C1 of the counter 4 is zero reset when the signal A1 is at logic state 1, i.e. as soon as the signal I exceeds the threshold Is, and this content C1 increases up to said preset value at the frequency of the clock signal H when the signal I is lower than the threshold Is (FIGS. 2 and 3).

The output signal A2 from the counter 4 is applied to the up-down counting input C/D of the up-down counter 5. The latter counts up, at the frequency of the clock signal H, when the signal A2 is at low state and counts down, also at the frequency of the clock signal H, when the signal A2 is at high state. The up-down counter supplies on output a tripping signal A3 which goes to state 1 when its content C2 reaches a second preset value, for example 256 in the embodiment represented.

In this way, the presence of a signal I lower than the threshold Is is only transmitted to the input C/D of the up-down counter 5 with a time lag R corresponding to the time necessary for the counter 4 to reach the first preset value, for example 16. In the case where the signal I is representative of a single-phase current signal, it drops back below the threshold Is on each half-wave as represented in FIG. 2, even when its peak value is greater than the threshold Is. The time delay circuit thus ignores any drop of the signal I below the threshold whose duration is less than the time lag R.

In the embodiment according to FIG. 2, the time lag R is equal to a half-period of the signal I, i.e. 10 ms for a signal whose frequency is 50 Hz. The up-down counter 5 thus ignores all the signal drops comprised between two successive peak values greater than the threshold Is. The time delay T is thus rendered totally insensitive to the form of the signal when the time lag R is greater than or equal to a half-period of the signal I.

In the embodiment according to FIG. 3, the time lag R is equal to a quarter of a period of the signal I, i.e. 5 ms for a signal whose frequency is 50 Hz. When the signal I has a peak value greater than the threshold Is but close to the latter, the signal I drops back below the threshold for a time greater than R between two successive peaks and the up-down counter 5 counts up then counts down during the time interval separating two successive peak values.

Figure 4:
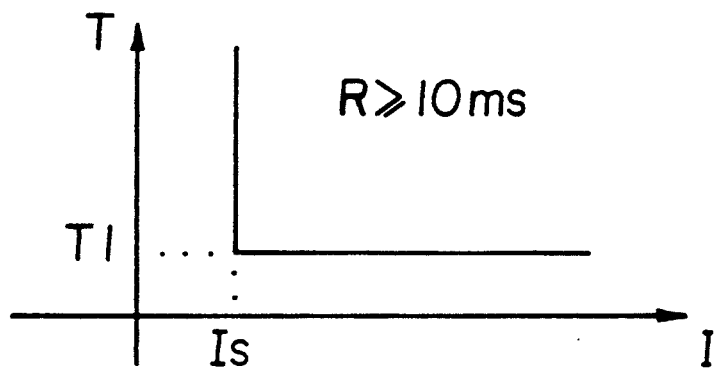
FIGS. 4 and 5 represent the short delay tripping curves of a trip device according to the invention, respectively for time lags $R \geq 10$ and $R = 5$ ms.
Figure 5:
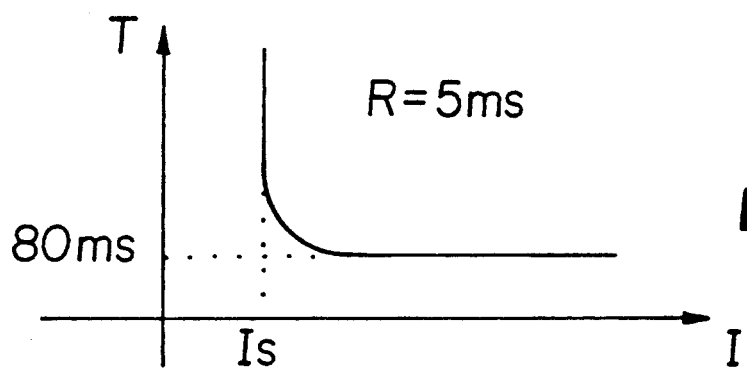

FIGS. 4 and 5 illustrate the tripping curves illustrating the time delay T in terms of the current I, respectively for a time lag R greater than or equal to a half-period of the signal I, for example R≧10 ms for a frequency of 50 Hz, and for a time lag equal to a quarter of said period, for example 5 ms. The second tripping curve (FIG. 5) is rounded and comprises an asymptote for I=Is, the count-down time between two peak values then being equal to the count-up time.

Figure 6:
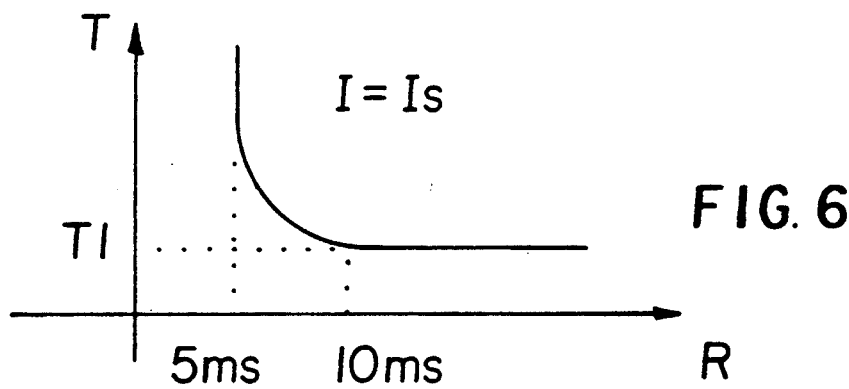
FIG. 6 represents the time delay T in terms of the time lag R when the current I is equal to the threshold Is.

A curve T (R) for I=Is is represented in FIG. 6. The time delay T1 is constant when R≧10 ms and tends to infinity when R=5 ms, the curve being rounded between these two values.

Taking account of the curves described above, it is therefore possible to determine the value of R, and also the frequency of the clock 6 and the maximum values of the contents C1 and C2 of the counter 4 and up-down counter 5, enabling the required time delay to be obtained for a predetermined current.

Without modifying the counters, it is possible to modify the short time delay by varying the frequency of the clock signals, i.e. the frequency of the clock signal H in FIG. 1, the time delay then being inversely proportional to the frequency of the clock signal H.

As an example, the counter 4 being a 16-counter and the up-down counter 5 a 256-counter, a clock frequency of 3.2 Hz results in a time lag R of 5 ms and in a minimum time delay of 80 ms, as represented in FIGS. 3 and 5.

Fault storing, by the up-down counter 5, during the time lag R, results in a non-tripping time being defined : a tripping order cannot be emitted if I is lower than the threshold Is for a time shorter than the non-tripping time. If a preset non-tripping time is required, the time lag R must be smaller than the difference between the preset short time delay and the non-tripping time. As an example, for a short time delay T1=80 ms, and a required non-tripping time of 60 ms, the time lag R must not exceed 20 ms. The non-tripping time can thus be easily mastered.

The invention can naturally be applied to a trip device associated with a multiphase, for example three-phase, circuit breaker in which the signal I representative of the current is obtained by rectification of the signals measured on the different phases.

The counter 4 and up-down counter 5 can moreover be actuated by clock signals of different frequencies, possibly derived from a single clock circuit of preset frequency.

We claim:

1. A short delay function electronic trip device designed to produce a tripping signal when an input signal, representative of a current flowing in at least one conductor to be protected, is greater than a preset threshold value over a preset time delay period, said trip device comprising: comparison means for comparing the input signal and the threshold value and for producing an output signal when the input signal is greater than the threshold value, and time delay means connected to the output of the comparison means, wherein the time delay means comprises a counter and an up-down counter each comprising a clock input coupled to receive clock signals of preset frequencies from a clock circuit, a zero reset input of the counter being connected to the output of the comparison means, and the output of the counter being connected to an up-down counting input of the up-down counter in such a way as to trigger its count-down when the content of the counter reaches a first preset value, wherein the up-down counter generates a tripping signal when its content reaches a second preset value.

2. The trip device according to claim 1, further comprising rectifying means connected to measurement means for measuring the current flowing in the conductor to be protected and generating said input signal.

3. The trip device according to claim 1, wherein a time lag necessary for the content of the counter to reach the first preset value in the absence of zero resetting of the counter is greater than or equal to a quarter-period of the current.

4. The trip device according to claim 3, wherein said time lag is greater than or equal to a half-period of the current.

5. The trip device according to claim 3, wherein said time lag is greater than or equal to 5 mm.

6. The trip device according to claim 3, wherein said time lag is smaller than the difference between the preset time delay and a preset non-tripping time.

7. The trip device according to claim 1, wherein the time delay is adjustable by modifying the frequency of the clock signals.

8. The trip device according to claim 1, wherein the clock signals of the counter and up-down counter are identical.

* * * * *